United States Patent [19]
Dobson

[11] 3,915,774
[45] Oct. 28, 1975

[54] METHOD OF BUILDING A NON-DEFLATABLE TIRE

[75] Inventor: Robert L. Dobson, Tallmadge, Ohio

[73] Assignee: The Goodyear Tire & Rubber Company, Akron, Ohio

[22] Filed: Feb. 4, 1974

[21] Appl. No.: 439,167

[52] U.S. Cl. ............... 156/113; 152/313; 152/323; 152/157; 156/79; 156/404; 156/272; 156/128 U; 264/27; 264/321; 425/4 R; 425/41; 425/42; 425/174.6
[51] Int. Cl.$^2$ .................. B29H 13/00; B60C 1/00
[58] Field of Search ........ 156/112, 113, 115, 110 R, 156/128 U, 79, 95, 97, 96, 128 R, 272, 380, 404; 264/272, 326, 321, 27; 425/4, 41, 42, 174.6

[56] References Cited
UNITED STATES PATENTS

| | | | |
|---|---|---|---|
| 706,590 | 8/1902 | Osgood et al. | 156/112 X |
| 1,375,360 | 4/1921 | Burke | 156/128 R |
| 1,422,537 | 7/1922 | Burke | 264/27 |
| 1,805,026 | 5/1931 | State | 156/128 R |
| 2,201,130 | 5/1940 | Branson | 425/174.6 |
| 2,395,920 | 3/1946 | Te Grotenhuis | 264/27 |
| 2,956,606 | 10/1960 | Beck et al. | 156/97 |
| 3,411,967 | 11/1968 | Rowland | 156/79 |
| 3,573,149 | 3/1971 | Tibble et al. | 156/272 |
| 3,770,931 | 11/1973 | Gilliatt | 425/41 |
| 3,794,706 | 2/1974 | Christie et al. | 156/113 |

FOREIGN PATENTS OR APPLICATIONS

| | | | |
|---|---|---|---|
| 714,026 | 7/1965 | Canada | 156/112 |

*Primary Examiner*—Clifton B. Cosby
*Attorney, Agent, or Firm*—F. W. Brunner; H. E. Hummer

[57] ABSTRACT

A method of using foamed elastomeric material to build a non-deflatable tire. A predetermined amount of unfoamed and uncured, foamable elastomeric material is placed in the cavity of a previously molded and vulcanized tire. An electrically conductive heating element such as a wire is embedded in the foamable material within the tire cavity. The tire, together with the foamable material and wire, is then mounted on a wheel rim. An electrical current is passed through the wire to heat it sufficiently to foam and cure the unfoamed elastomeric material within the tire cavity.

13 Claims, 1 Drawing Figure

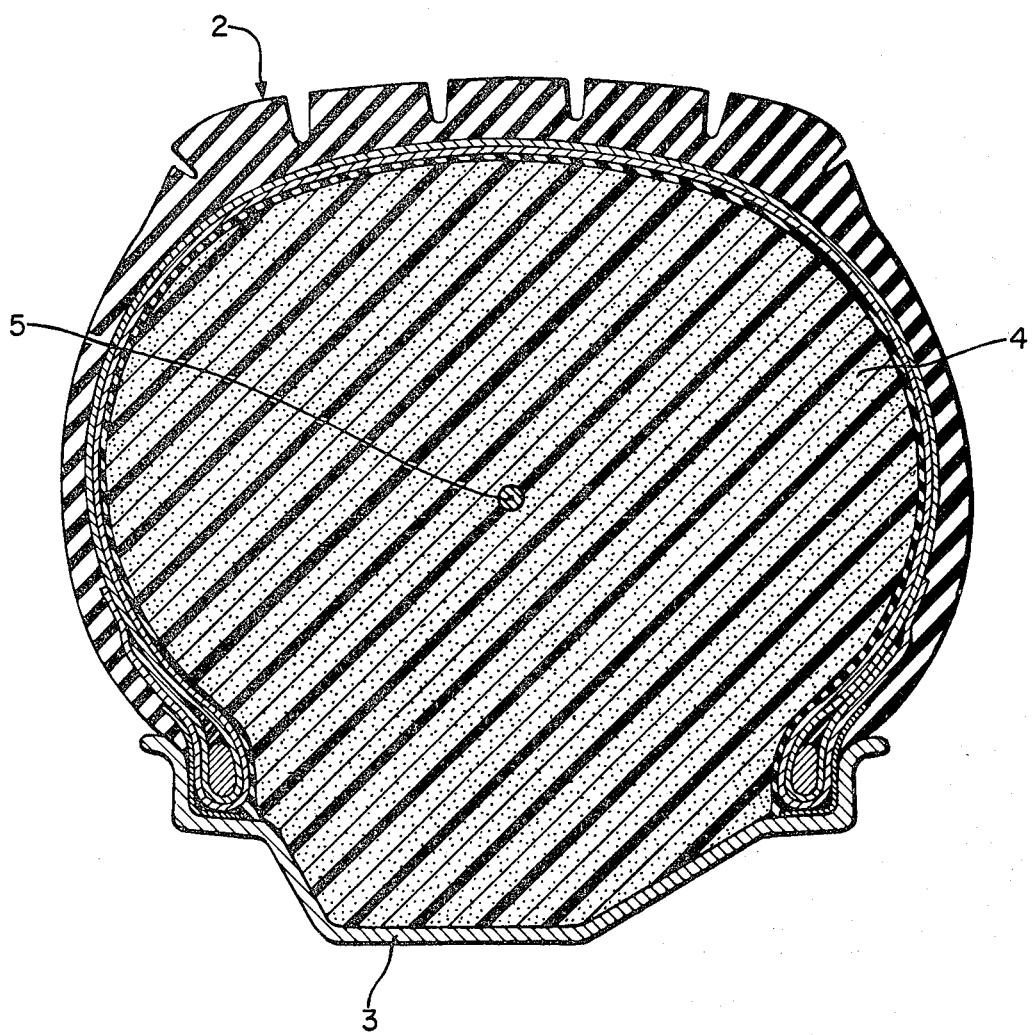

METHOD OF BUILDING A NON-DEFLATABLE TIRE

BACKGROUND OF THE INVENTION

The invention is particularly useful in making tires non-deflatable by filling them with foamed elastomeric material such as a natural rubber, polyisoprene, ethylene-propylene terpolymer, polybutadiene, silicone polymer, GRS (now known as styrene-butadiene rubber), neoprene, acrylonitrile (nitrile) rubber, chlorosulfonated polyethylene, isobutylene-isoprene (butyl) rubber, halogenated isobutylene-isoprene rubber, ethylene-propylene copolymer, and oxypropylene rubber. This is accomplished in a number of different ways. For example, the unfoamed material can be extruded and formed into an annular log which is placed in the cavity of a previously vulcanized tire, or strips of the unfoamed material can be layered in the cavity of a precured tire as described in U.S. Pat. No. 3,650,865, or the unfoamed material can be placed in the cavity of the tire in accordance with the transfer molding techniques described in U.S. Pat. No. 3,676,028. The tire with the unfoamed and uncured material, is then mounted on a rim and contacted with a suitable heated curing medium, e.g. steam or hot air heated to a temperature sufficient to foam and cure the material within the cavity of the tire. It is important to foam and cure the material within the tire cavity as quickly as possible to prevent over-exposure of the precured tire to the heated curing medium which can overcure the rubber material of the tire and affect the treadwear characteristics and esthetic appearance of the tire. The invention is directed to an improved method of foaming and curing the foamable material used in building a non-deflatable tire.

Briefly stated, the invention comprises placing a predetermined amount of any of the aforementioned materials within the cavity of a previously molded and vulcanized tire. The tire with the unfoamed and uncured foamable elastomeric material is mounted on a wheel rim. An electrically conductive element is embedded in the unfoamed and uncured elastomeric material, prior to mounting the tire on the rim. This element is then wired in circuit with a source of electric current suitable for heating the element to a temperature sufficient for foaming and curing the material within the cavity of the tire. The foaming and curing of the material within the tire cavity may be facilitated in some cases by externally contacting the tire and rim with a heated fluid.

The FIGURE is a cross section of a tire.

With reference to the drawing, which is a section of a tire 2 that is mounted on a wheel rim 3 and filled with foamed elastomeric material 4, the electrically conductive elements is any appropriate wire which is heatable to a temperature sufficient to foam and cure the unfoamable elastomeric material within the tire cavity. Generally, the material begins foaming at 210°–220°F. It has been found that a wire, heated to a temperature of about 500°F. is sufficient to correspondingly heat the adjacent foamable material to a preferred temperature of about 300°F. Conventional 22-gauge solid copper and solid nickel wires were successfully used as heating elements. A single wire, or a plurality of wires may be used as a heating element. The wires are preferably insulated to lessen the possibility of a short circuit which is undesirable and can create defects in the tire. The wire heating elements can be coiled within the annular foamable insert in the tire cavity. Opposing ends of the wires are passed through holes drilled in a sidewall of the tire. These ends or terminals are placed in electrical communication with a source of direct electrical current sufficient to heat the wires to a temperature of about 500°F. which in most cases is adequate to foam and cure any of the aforementioned materials. The wire heating elements can also be coiled sinusoidally between adjacent layers of the unfoamed material.

EXAMPLE I

A 4.80/4.00–8 non-deflatable tire was built using a 22-gauge bare nickel wire which was wrapped in a sinusoidal shape, whereby a total of approximately 44 feet of wire was placed between two strips of foamable rubber material, each measuring ¼ inch thick by 4 inches by 11 feet long. This assembly of unfoamed material and wire was then placed within the cavity of the tire and leads from the wire were taken from the tire through holes drilled in the sidewall of the tire. The tire with the foamable insert was next mounted on a rim and placed in an oven heated to a temperature of about 250°F. As previously indicated, any suitable hot gas, or steam, can be used to contact the tire and rim assembly in the oven. Surface oxidation of the tire can be eliminated, or reduced substantially, by using saturated steam at a temperature in the broad range of from 212° to 400°F., or the more selective range of from 250° to 325°F. Saturated steam at a temperature of 300°F. is preferable. The wire leads were wired to a source of electrical current which was then passed through the wire to heat it to a temperature of about 500°F.

It was found that the time to effectively heat and foam the material within the tire was largely dependent on the time interval required to heat the wire to a temperature of about 500°F. The first trials took anywhere from 3 to 4 hours to foam and cure the insert within the tire, whereas effective cures of the foamable material of the insert were achieved in less than 1½ hours when the wire was heated more rapidly to the 500° F. level. Conventional 26 and 30-gauge solid copper wires were also successfully used in building foam-filled tires. The time of foaming and curing the foamable elastomeric material within the tire cavity was reduced from the normal time of 6–9 hours to 1½–2 hours using this method of internally heating the unfoamed annular insert within the tire cavity. It is theorized that this method will be especially beneficial in building a large non-deflatable tire composed of a huge mass of rubber which is difficult to heat and, when once heated, acts as a massive heat sink that can produce an overcure of the foamed rubber insert within the tire. In either case, where the foamable insert is internally heated, or both internally and externally heated, the previously molded and vulcanized tire is exposed to high temperatures for shorter periods of time to reduce the possibility of any overcure of the rubber material forming the tread and sidewalls of the tire. The foamable annulus, or ring, within the tire, is also more equally heated, thereby producing a more uniformly foamed and cured annular insert to create a better non-deflatable tire than those normally built without the application of internal heat to the unfoamed insert.

While certain representative embodiments and details have been shown for the purpose of illustrating the invention, it will be apparent to those skilled in the art that various changes and modifications may be made therein without departing from the spirit or scope of the invention.

What is claimed is:

1. A method of building a non-deflatable tire, comprising the steps of:
    a. forming an annulus of unfoamed and uncured, heat foamable elastomeric material within the cavity of a previously molded and vulcanized tire;
    b. embedding at least one flexible electrically conductive wire within the annulus in the cavity of the tire;
    c. mounting the tire with the annulus and element on a wheel rim; and thereafter
    d. passing an electric current through the wire to heat the wire and consequently heat the annulus and cause foaming and curing of the foamable material thereof.

2. The method of claim 1, wherein the elastomeric material is selected from the group of natural rubber, polyisoprene, ethylene-propylene terpolymer, polybutadiene, silicone polymer, styrene-butadiene rubber, neoprene, acrylonitrile rubber, chlorosulfonated polyethylene, isobutylene-isoprene rubber, halogenated isobutylene-isoprene rubber, ethylene-propylene copolymer, and oxypropylene rubber.

3. The method of claim 1, wherein the step of embedding the element in the annulus includes coiling at least one wire in sinuous relation between adjacent layers of unfoamed and uncured, foamable elastomeric material.

4. The method of claim 3, wherein the wire has a pair of opposing ends extending from the tire for wiring in circuit with a source of electrical current.

5. The method of claim 1, which includes simultaneously passing electric current through the element while contacting the tire mounted on the rim with a heated fluid to help foam and cure the material within the cavity of the tire.

6. The method of claim 5, wherein the heated fluid is saturated steam at a temperature in the broad range of from 212° to 400° F.

7. The method of claim 6, wherein the saturated steam is at a temperature in the more selective range of from 250° to 325° F.

8. A method of building a non-deflatable tire, comprising the steps of:
    a. forming an annulus of unfoamed and uncured, hot foamable elastomeric material within the cavity of a previously molded and vulcanized tire, the material selected from the group of natural rubber, polyisoprene, ethylene-propylene terpolymer, polybutadiene, silicone polymer, styrene-butadiene rubber, neoprene, acrylonitrile rubber, chlorosulfonated polyethylene, isobuteneisoprene rubber, halogenated isobutylene-isoprene rubber, ethylene-propylene copolymer, and oxypropylene rubber;
    b. embedding at least one flexible electrically conductive wire within the annulus in the cavity of the tire;
    c. mounting the tire with the annulus and wire on a wheel rim;
    d. passing an electric current through the wire to heat the wire to a temperature sufficient to cause foaming and curing of foamable elastomeric material adjacent the element; and
    e. simultaneously contacting the tire, mounted on the rim, with a heated fluid to help foam and cure the foamable elastomeric material within the cavity of the tire.

9. The method of claim 8, wherein the heated fluid is saturated steam at a temperature in the broad range of from 212°to 400°F.

10. The method of claim 9, wherein the saturated steam is at a temperature in the narrow range of from 250°to 325°F.

11. The method of claim 10, wherein the saturated steam is at a temperature of 300°F.

12. The method of claim 9, wherein the element in the annulus includes at least one coil of wire.

13. The method of claim 9, wherein the element in the annulus includes at least one wire sinuously coiled between adjacent layers of unfoamed and uncured, foamable elastomeric material.

* * * * *

UNITED STATES PATENT OFFICE
CERTIFICATE OF CORRECTION

PATENT NO. : 3,915,774
DATED : October 28, 1975
INVENTOR(S) : Robert L. Dobson

It is certified that error appears in the above-identified patent and that said Letters Patent are hereby corrected as shown below:

Column 1, line 55, "elements is" should be

-- element 5 --.

Signed and Sealed this twenty-third Day of March 1976

[SEAL]

Attest:

RUTH C. MASON
Attesting Officer

C. MARSHALL DANN
Commissioner of Patents and Trademarks